(12) United States Patent
O'Donnell et al.

(10) Patent No.: US 8,939,122 B2
(45) Date of Patent: Jan. 27, 2015

(54) ENGINE STARTING STRATEGY TO AVOID RESONANT FREQUENCY

(75) Inventors: Timothy M. O'Donnell, Germantown Hills, IL (US); Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 13/545,578

(22) Filed: Jul. 10, 2012

(65) Prior Publication Data

US 2014/0014055 A1    Jan. 16, 2014

(51) Int. Cl.
*F02N 11/08* (2006.01)
*F02N 11/00* (2006.01)

(52) U.S. Cl.
CPC ............ *F02N 11/0851* (2013.01); *F02N 11/08* (2013.01)
USPC .................................................... 123/179.3

(58) Field of Classification Search
USPC ............ 123/179.3, 179.28; 701/101, 113, 22; 180/65.1, 65.265; 477/5
See application file for complete search history.

(56) References Cited

U.S. PATENT DOCUMENTS

| | | | |
|---|---|---|---|
| 6,997,156 B2 | 2/2006 | Tanei et al. | |
| 7,207,919 B2 * | 4/2007 | Tsuneyoshi et al. | 477/5 |
| 8,116,957 B2 | 2/2012 | Oh et al. | |
| 2001/0029220 A1 * | 10/2001 | Kato | 477/5 |
| 2005/0202929 A1 * | 9/2005 | Tsuneyoshi et al. | 477/5 |
| 2006/0089232 A1 * | 4/2006 | Kobayashi et al. | 477/70 |
| 2008/0129049 A1 * | 6/2008 | Sauvlet et al. | 290/34 |
| 2008/0251303 A1 | 10/2008 | Rouaud et al. | |
| 2009/0233766 A1 | 9/2009 | Kadota | |
| 2010/0048353 A1 * | 2/2010 | Iwase et al. | 477/167 |
| 2011/0118078 A1 | 5/2011 | Kraska et al. | |
| 2011/0307137 A1 * | 12/2011 | Bryan et al. | 701/22 |
| 2013/0288854 A1 * | 10/2013 | Kobayashi | 477/5 |

* cited by examiner

*Primary Examiner* — Mahmoud Gimie
(74) *Attorney, Agent, or Firm* — Leydig, Voit & Mayer, Ltd.

(57) ABSTRACT

A machine comprising a clutch, an engine operable at a resonant frequency engine speed, and a hybrid motor. The hybrid motor is connected to the engine through the clutch. The hybrid motor applies power to the engine when the clutch is engaged, and does not apply power to the engine when the clutch is disengaged. The hybrid motor is operable at a predetermined hybrid motor speed. An ignition switch starts the hybrid motor. An electronic control module disengages the clutch until the hybrid motor speed exceeds the predetermined hybrid motor speed, and engages the clutch after the hybrid motor speed exceeds the predetermined hybrid motor speed.

18 Claims, 3 Drawing Sheets

ENGINE STARTING STRATEGY TO AVOID RESONANT FREQUENCY

TECHNICAL FIELD

This patent disclosure relates generally to engines and, more particularly, to starting engines.

BACKGROUND

Engine driven machines can experience resonance when the vibration frequency of the driving part, such as a motor or engine, matches the mechanical resonant frequencies of the components of the machine. Many large machines experience resonant frequencies within the powertrains as a result of vibration caused by the speed output of an engine as the cylinders of the engine go through the combustion cycle. At certain engine speeds that correspond to resonant frequencies, the amplitude of the torque applied to the component parts increases dramatically, which can damage mechanical components of a machine. Engineers have learned to design power systems so that the resonant frequencies in the powertrain occur at engine speeds outside the normal operating range of a particular machine to avoid damage.

Though not seen in the normal operating range of the machine, resonant frequencies can still occur during lower start-up engine speeds as the engine attempts to overcome the large inertial forces required to rotate large machine components and parasitic load caused by pump drag, engine friction, and other non-inertial loads. Achieving an engine speed above which machine components experience resonance is particularly difficult in cold weather, when an engine can fail to speed up successfully through the resonant frequency engine speeds.

SUMMARY

The disclosure describes, in one aspect, a machine comprising a clutch adapted to engage and to disengage, an engine operable at various engine speeds including a resonant frequency engine speed, and a hybrid motor. The hybrid motor is selectively operatively connected to the engine through the clutch. The hybrid motor is also adapted to apply power to the engine when the clutch is engaged, and the hybrid motor is adapted to not apply power to the engine when the clutch is disengaged. The hybrid motor is operable at various hybrid motor speeds including a predetermined hybrid motor speed. The machine includes an ignition switch operatively associated with the hybrid motor such that the ignition switch is adapted to start the hybrid motor. The machine also includes an electronic control module configured to control the clutch to disengage until such time as the hybrid motor speed exceeds the predetermined hybrid motor speed, and to engage to allow the hybrid motor to apply power to the engine at a time when the hybrid motor speed exceeds the predetermined hybrid motor speed.

In another aspect, the disclosure describes a method of starting an machine. The method comprises providing an engine operable at various engine speeds including a resonant frequency engine speed. The method also includes providing a hybrid motor operable at various hybrid motor speeds including a predetermined hybrid motor speed. The method includes operatively connecting the hybrid motor to the engine through a clutch. The hybrid motor is adapted to apply power to the engine when the clutch is engaged and not adapted to apply power to the engine when the clutch is disengaged. The method includes disengaging the clutch when the hybrid motor speed is less than the predetermined hybrid motor speed, and engaging the clutch when the hybrid motor reaches the predetermined hybrid motor speed.

In yet another aspect, the disclosure describes a method of starting a machine. The method comprises providing a clutch adapted to engage and to disengage. The method also includes providing a hybrid motor operable at various hybrid motor speeds. The method includes operatively associating an ignition switch with the hybrid motor, and operatively associating an electronic control module with the clutch and the hybrid motor. The electronic control module is configured to control the clutch to engage and disengage. The method also includes operatively connecting an engine to the hybrid motor through the clutch such that the hybrid motor is adapted to apply power to the engine when the clutch is engaged and the hybrid motor is not adapted to apply power to the engine when the clutch is disengaged. The method includes starting the hybrid motor when the ignition switch is triggered, and controlling the clutch to disengage when the ignition switch is triggered. The method also includes controlling the clutch to engage when the hybrid motor exceeds a predetermined hybrid motor speed.

DETAILED DESCRIPTION

Figure 1:
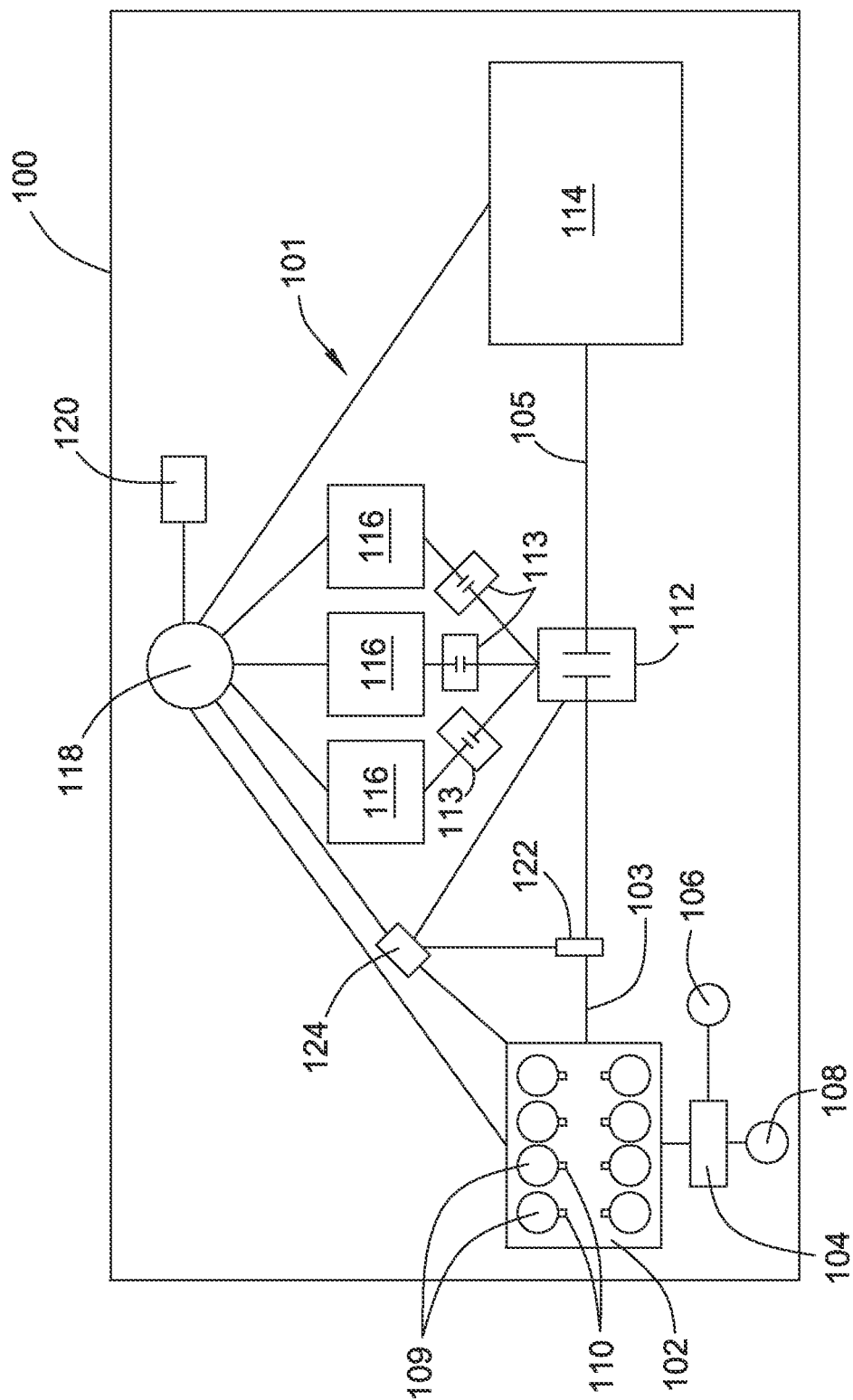
FIG. 1 is a schematic illustration of a machine in accordance with the disclosure.

This disclosure relates to methods of implementing an engine starting strategy for a machine 100 that avoids subjecting the machine and its components to the damaging effects of resonant frequencies occurring in the machine's powertrain. As illustrated schematically in FIG. 1, the machine 100 has a powertrain 101 that includes components such as an engine 102, a crankshaft 103, a clutch 112, a clutch shaft 105, auxiliary mechanisms 116, and a transmission 114. The powertrain 101 can also include other components not illustrated herein. In the illustrated embodiment, an engine starter 104 is connected to the engine 102. The engine starter 104 can be an electric motor engaged by the machine's 100 ignition switch 106, but could also be any suitable kinetic energy source capable of starting an engine. The engine starter 104 is connected to an electronic power source 108 such as a battery or other electronic storage, that supplies the engine starter with electric power. The engine 102 can also have injectors 110 that inject fuel, air, or other materials into the engine cylinders 109 for combustion. The embodiment schematically represented in FIG. 1 shows an engine 102 with eight cylinders 109 and eight injectors 110, though any number of injectors or cylinders is contemplated, and each cylinder can have more than one injector depending on the specific engine design. Pistons inside the cylinders 109 are connected to a crankshaft 103. The crankshaft 103 rotates as a result of the combustion within the cylinders 109 and corresponding piston oscillation.

The clutch 112 connects the engine 102 to the transmission 114 between the crankshaft 103 and the clutch shaft 105, with the crankshaft connecting the engine to the clutch, and the clutch shaft connecting the transmission to the clutch. The clutch 112 can be engaged or disengaged either automatically by an electronic control module 124 or by the machine 100 operator. Engaging the clutch 112 locks the crankshaft 103 and the clutch shaft 105 so that both rotate substantially at the same rate, applying power from the engine 102 to other components. When the clutch 112 is engaged, the engine 102 can apply power to the transmission 114. When the clutch 112 is disengaged, no power from the engine 102 is applied to the transmission 114 because the clutch does not transfer crankshaft 103 rotation to the clutch shaft 105.

In some embodiments, the clutch 112 also connects the engine 102 to auxiliary mechanisms 116. Auxiliary mechanisms 116 can be compressors, pumps for coolant, oil and other fluids, compressors, or any other mechanisms the machine 100 uses that require power. In such embodiments, engaging and disengaging the clutch 112 enables and disables, respectively, the application of power from the engine 102 to the auxiliary mechanisms 116. While the embodiment illustrated in FIG. 1 shows three auxiliary mechanisms 116, it is contemplated that any number of auxiliary mechanisms can be included. In other embodiments, it is contemplated that additional auxiliary clutches 113 separate from the clutch 112 can connect the engine 102 to the auxiliary mechanisms 116. In such embodiments, the auxiliary mechanisms 116 can be connected or disconnected from the engine 102 independently of whether the transmission 114 is connected or disconnected from the engine. The embodiment in FIG. 1 shows auxiliary clutches 113 between the auxiliary mechanisms 116 and the clutch 112; however, the auxiliary clutches can also be located between the engine 102 and the clutch, or bypass the clutch altogether by connecting the engine directly to the auxiliary mechanisms with the auxiliary clutches.

The machine 100 also includes a hybrid motor 118 that, in some embodiments, is connected to the transmission 114, auxiliary mechanisms 116, the engine 102, or any other powertrain 101 components. The hybrid motor 118 can apply power to the powertrain 101 components separately from or in addition to the engine 102, depending on whether the clutch 112 is engaged or disengaged, as is described in greater detail below. In some embodiments the hybrid motor 118 can apply power directly to the engine 102 or to the engine through other powertrain 101 components. Also, in some embodiments, the hybrid motor 118 receives energy from a stored energy source 120. The stored energy source 120 stores energy from a direct source, such as an electrical grid, or energy generated by the vehicle. The hybrid motor 118 uses the stored energy to apply power to powertrain 101 components. Although not shown in the figures, it is contemplated that additional clutches can separate the hybrid motor 118 from the powertrain 101 components. In such embodiments, the additional clutches engage and disengage to allow the hybrid motor 118 to apply power to certain powertrain 101 components and not other powertrain components at a given time, or apply power to all or none of the power train components at a given time.

To start the engine 102 in some embodiments, triggering the ignition switch 106 completes a circuit that allows electricity to flow from an electric power source 108 to the engine starter 104. The electric power source 108 can be a battery, a hard electrical line, or any other suitable source of electricity. The engine starter 104 converts the electric power from the electric power source 108 into kinetic energy to begin cycling the engine 102. At a certain point after the ignition switch 106 is triggered, the injectors 110 begin injecting fuel and air into the engine's 102 cylinders 109 to begin and maintain the combustion process. Pistons in the cylinders 109 oscillate in response to the combustion process and rotate the crankshaft 103. The rotating crankshaft 103 applies power to the powertrain 101 components to overcome resistant inertial forces and the parasitic load of those components and cause them to rotate. Parasitic load can result from pump drag, engine friction, or other non-inertial loads on the engine.

The speed of the engine 102 can be described as the number of revolutions the engine causes the crankshaft 103 to make per minute (RPM). The engine 102 is capable of outputting a wide range of engine speeds. At certain engine 102 speeds, the vibration frequency caused by the engine can match the powertrain's 101 mechanical resonant frequencies. At these resonant frequency engine 102 speeds, the powertrain 101 components can experience large amplitudes of torque, which can damage the components. Similarly, the vibration frequency caused by the transmission 114 as it rotates can cause resonance in the powertrain 101. The transmission 114 speeds that cause resonance are identified as resonant frequency transmission 114 speeds in this disclosure.

The rotational speed of the powertrain 101 components may be determined using rotary encoders or other suitable rotation sensors. The embodiment illustrated in FIG. 1 shows a rotary sensor 122 connected to the electronic control module 124. The electronic control module 124 may also be connected operatively to both the engine 102, the hybrid motor 118, and the clutch 112, and is configured to control the activity of those and other components. Some embodiments may implement additional sensors, such as torque sensors, that measure the torque levels experienced by the powertrain 101 components and communicate those levels back to the electronic control module 124. The torque levels caused by the engine 102 applying power to the powertrain 101 are engine torque levels, and the torque levels caused by the hybrid motor 118 applying power to the powertrain are hybrid torque levels. Hybrid torque sensors 123 can sense the hybrid torque levels, and engine torque sensors 125 can sense the engine torque levels. The engine torque sensors 125 are operatively associated with the electronic control module 124 and adapted to send signals indicative of the engine torque levels to the electronic control module. The hybrid torque sensors 123 are also operatively associated with the electronic control module 124 and adapted to send signals indicative of the hybrid torque levels to the electronic control module. Additionally, other rotary sensors can be used, for example, on the clutch shaft 105, to send signals to the electronic control module 124 to monitor the transmission 114 speed. The operative connection between the sensors and the electronic control module 124 can be made in any suitable manner, for example, wirelessly or by a hardwired electronic connection.

In some embodiments, the engine 102 is connected to the hybrid motor 118 through the clutch 112 such that the hybrid motor can apply power to the engine when the clutch is engaged. In such embodiments, the clutch 112 disengages before, as, or after the ignition switch 106 is triggered. Triggering the ignition switch 106 starts the hybrid motor 118 and causes the hybrid motor to begin spinning through various hybrid motor speeds. As the hybrid motor 118 speed increases, the kinetic energy of the hybrid motor increases as well. At a certain, predetermined hybrid motor 118 speed, the clutch 112 is engaged and the kinetic energy of the hybrid motor is transferred to the engine 102. The predetermined hybrid motor 118 speed is calculated by determining the hybrid motor speed for which the kinetic energy of the hybrid motor is sufficient to transfer enough power to the engine 102 to speed the engine to an engine speed that exceeds the resonant frequency engine speed. In other words, when the clutch 112 is engaged, the hybrid motor 118 provides enough kinetic energy to the engine 102 to quickly speed the engine through the resonant frequency engine speed, which limits the damaging effects on the powertrain 101 components.

In other embodiments, the hybrid motor 118 is operatively connected to at least one powertrain 101 component, such as the transmission 114, the auxiliary mechanisms 116, or other components. In such embodiments, the powertrain 101 components are operatively connected to the engine when the clutch 112 is engaged, but not connected to the engine when the clutch is disengaged. When the hybrid motor 118 applies power to these components, they speed up and develop kinetic energy of their own. The powertrain 101 component kinetic energy increases as the hybrid motor 118 spins the components at increasing speeds. With the clutch 112 is disengaged, the hybrid motor 118 can apply power to the powertrain 101 components and spin them up to speed without the burden of the engine 102. When the clutch 112 is engaged after the hybrid motor 118 has spun up the powertrain 101 components, the powertrain component kinetic energy is transferred to the engine 102. The powertrain 101 component kinetic energy can be determined based on the specific hybrid motor 118 speed. At a certain hybrid motor 118 speed, the powertrain 101 component kinetic energy is such that the kinetic energy transferred to the engine 102 when the clutch 112 is engaged is sufficient to speed the engine to an engine speed that exceeds the resonant frequency engine speed.

Additionally, in both the embodiments discussed above involving the hybrid motor 118 transferring kinetic energy alone or the hybrid motor 118 and other powertrain 101 components transferring kinetic energy to the engine 102, the engine starter 104 can be used simultaneously to apply power to the engine when the clutch 112 is engaged. In such embodiments, the engine starter 104 applies power to the engine 102 before or after the clutch 112 engages, helping the hybrid motor 118 speed the engine speed to exceed the resonant frequency engine speed.

In some embodiments, the electronic control module 124 can monitor the hybrid motor 118 speed and control the clutch 112 to engage and disengage based on the kinetic energy that has been built up by either the hybrid motor 118 alone or the hybrid motor with other powertrain 101 components. The hybrid motor 118 speed sufficient to transfer the amount of kinetic energy to the engine 102 may be different when the hybrid motor is acting alone versus when the hybrid motor is powering the other powertrain 101 components. In either embodiment, the electronic control module 124 is configured to disengage the clutch at a time before the hybrid motor 118 reaches a speed that is sufficient to transfer enough kinetic energy to the engine 102 to exceed the resonant frequency engine speed. This time can be when the ignition switch 106 is triggered, or at another time before the predetermined hybrid motor 118 is reached. The electronic control module 124 is also configured to control the clutch 112 to engage at a time after the hybrid motor 118 reaches the predetermined hybrid motor speed. In either case, the kinetic energy from either the hybrid motor 118 alone or from hybrid motor 118 combined with the other powertrain 101 components powers the engine 102 to an engine speed that exceeds the resonant frequency engine speed.

Even though most machines are designed to avoid resonance during the normal operating range, the engine 102 speed upon startup can still cause resonance as the engine attempts to overcome inertial forces and parasitic load in the powertrain 101. The following paragraphs describe methods for preventing the machine 100 from experiencing resonance during machine startup.

Figure 2:
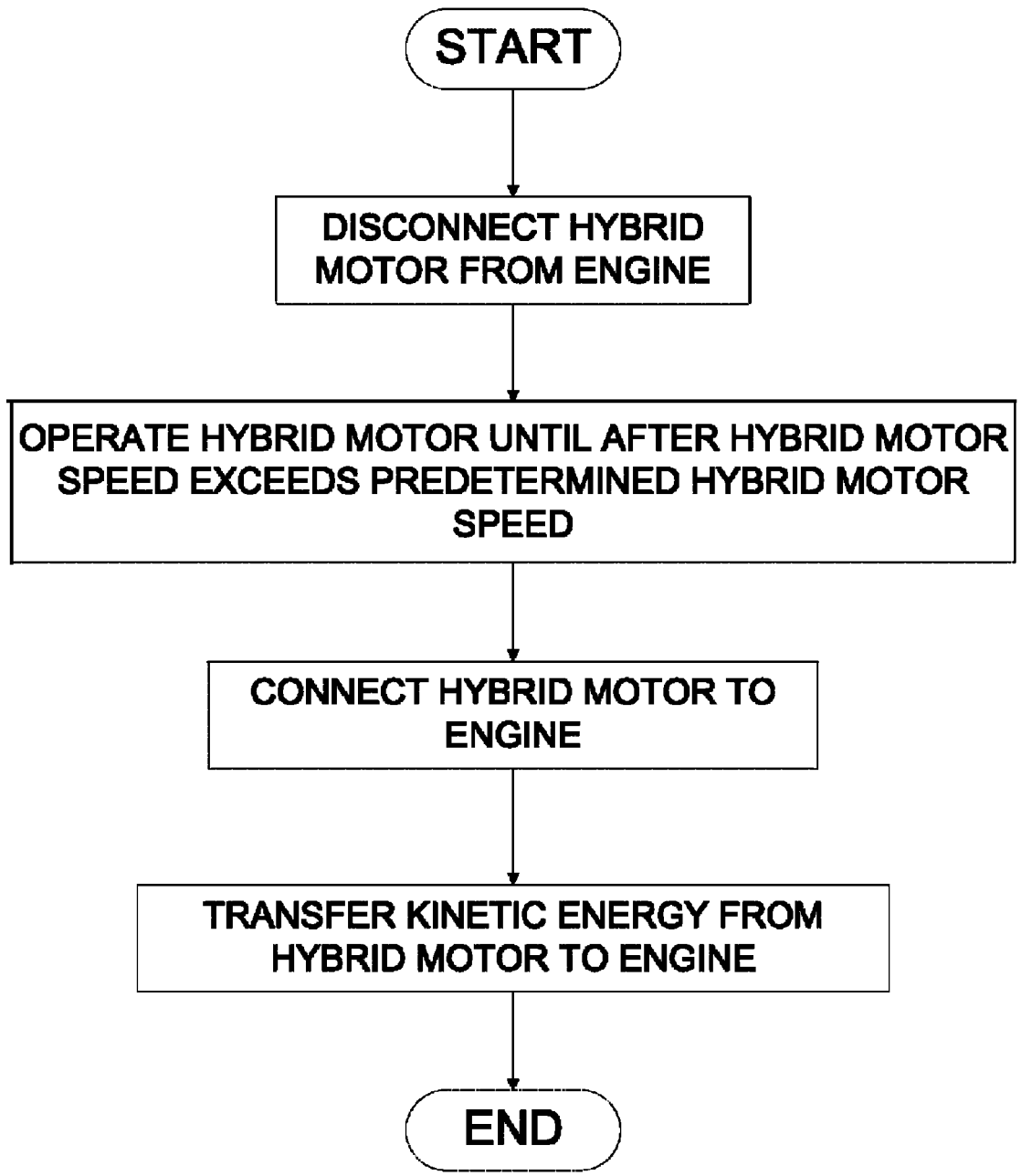
FIG. 2 is a flow chart illustrating an engine starting strategy in accordance with the disclosure.

One method of starting the machine 100 is illustrated in FIG. 2. The illustrated method involves using kinetic energy from the hybrid motor 118 to quickly speed up the engine 102 to an engine speed that exceeds the resonant frequency speed. The method involves operatively connecting the hybrid motor 118 to the engine 102 through the clutch 112, such that the hybrid motor can apply power to the engine when the clutch is engaged. When the clutch 112 is disengaged, the hybrid motor 118 is free to speed up without the burden of powering the engine 102. The illustrated method involves disengaging the clutch when the hybrid motor 118 speed is less than a predetermined hybrid motor speed that would power the engine 102 speed to exceed the resonant frequency engine speed. The method also involves engaging the clutch 112 when the hybrid motor 118 speed exceeds the predetermined hybrid motor speed. The kinetic energy from the hybrid motor 118 transferred to the engine 102 is sufficient to power the engine speed to exceed the resonant frequency engine speed.

Figure 3:
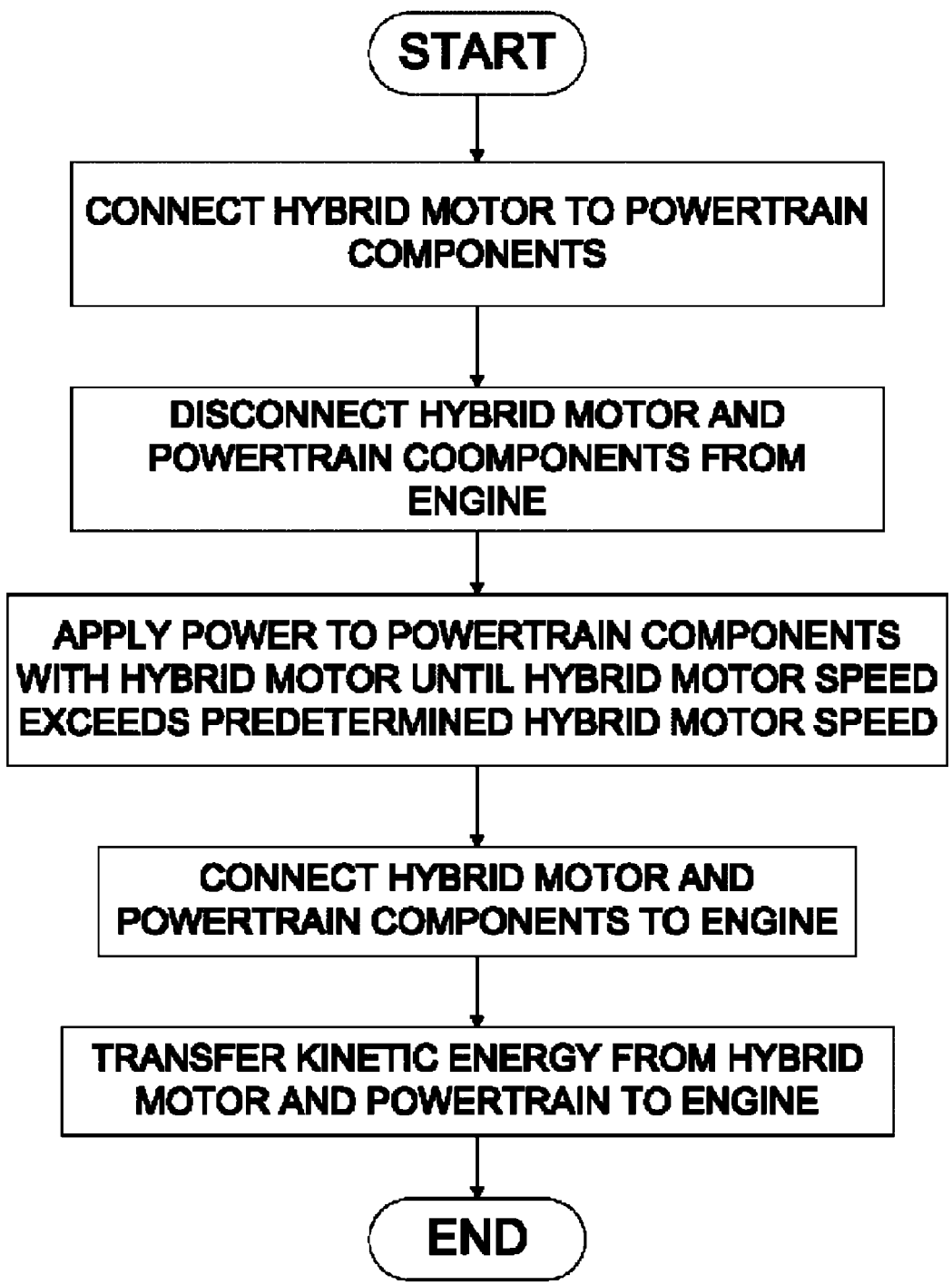
FIG. 3 is a flow chart illustrating another embodiment of an engine starting strategy in accordance with the disclosure.

In another method, illustrated in FIG. 3, the hybrid motor 118 is operatively connected to at least one powertrain 101 component, such as the transmission 114 or the auxiliary mechanisms 116. The hybrid motor 118 is adapted to apply power to the powertrain 101 components, which results in the components spinning and developing powertrain 101 component kinetic energy. In this method, the clutch 112 disengages when the powertrain 101 component kinetic energy is insufficient to transfer adequate energy to the engine 102 to power the engine to an engine speed that exceeds the resonant frequency engine speed. When the hybrid motor 118 speed reaches a predetermined hybrid motor speed, the clutch 112 engages, allowing the powertrain 101 component kinetic energy to transfer to the engine 102. The powertrain 101 component kinetic energy can be determined from monitoring the hybrid motor 118 speed with the electronic control module 124. The predetermined hybrid motor 118 speed is the speed that corresponds to the powertrain 101 component kinetic energy that is sufficient to transfer enough power to the engine 102 so the engine speed exceeds the resonant frequency engine speed. The electronic control modules 124 of this disclosure may be of any conventional design having hardware and software configured to perform the calculations and send and receive appropriate signals to perform the engagement logic. The electronic control module 124 may include one or more controller units, and may be configured solely to perform the engagement strategy, or to perform the engagement strategy and other processes of the machine 100. The controller unit may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The arrangement disclosed herein has universal applicability in various other types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The industrial application of the methods for starting a machine that avoid effects of resonant frequencies as described herein should be readily appreciated from the foregoing discussion. The present disclosure may be applicable to any type of machine utilizing a powertrain that experiences resonant frequencies. It may be particularly useful in machines that include a hybrid motor that can apply power to components of the machine's powertrain.

The disclosure, therefore, may be applicable to many different machines and environments. One exemplary machine suited to the disclosure is an off-highway truck. Off-highway trucks have large components that burden the truck's engine during startup with large inertial forces and parasitic load. These large inertial forces and parasitic load may result in damaging torque amplitudes experienced by the machine components at the powertrain's resonant frequency. Thus, a method for starting a machine that avoids the effects of resonant frequencies is readily applicable to an off-highway truck.

Further, the methods above can be adapted to a large variety of machines. For example, other types of industrial machines, such as backhoe loaders, compactors, feller bunchers, forest machines, industrial loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising:
a clutch adapted to engage and to disengage;
an engine operable at various engine speeds including a resonant frequency engine speed;
a hybrid motor selectively operatively connected to the engine through the clutch, the hybrid motor is adapted to apply power to the engine when the clutch is engaged, and the hybrid motor is adapted to not apply power to the engine when the clutch is disengaged, the hybrid motor operable at various hybrid motor speeds including a predetermined hybrid motor speed that is sufficient to power the engine to an engine speed that exceeds the resonant frequency engine speed;
an ignition switch operatively associated with the hybrid motor, such that the ignition switch is adapted to start the hybrid motor; and
an electronic control module configured to control the clutch to disengage until such time as the hybrid motor speed exceeds the predetermined hybrid motor speed, and to engage to allow the hybrid motor to apply power to the engine at a time after the hybrid motor speed exceeds the predetermined hybrid motor speed.

2. The machine of claim 1 wherein:
the predetermined hybrid motor speed is associated with a predetermined hybrid motor kinetic energy; and
the predetermined hybrid motor kinetic energy is sufficient to power the engine to a speed that exceeds the resonant frequency engine speed.

3. The machine of claim 1, further comprising an engine starter operatively connected to the engine, the engine starter adapted to apply power to the engine.

4. The machine of claim 3, wherein:
the electronic control module is operatively associated with the engine starter; and
the electronic control module is further configured to control the engine starter to apply power to the engine when the clutch engages and at least until the engine speed exceeds the resonant frequency engine speed.

5. The machine of claim 1, further comprising at least one powertrain component, the at least one powertrain component being operatively connected to the hybrid motor such that the hybrid motor is adapted to apply power to the at least one powertrain component.

6. The machine of claim 5, wherein the at least one powertrain component is operatively connected to the engine through the clutch such that a powertrain component kinetic energy can be transferred to the engine when the clutch is engaged and the powertrain component kinetic energy cannot be transferred to the engine when the clutch is disengaged.

7. The machine of claim 6, wherein the hybrid motor is adapted is adapted to apply power to the at least one powertrain component when the ignition switch is triggered.

8. The machine of claim 7, wherein:
the predetermined hybrid motor speed is associated with a predetermined powertrain component kinetic energy; and
the predetermined powertrain component kinetic energy is sufficient to transfer enough powertrain component kinetic energy to the engine to power the engine to a speed that exceeds the resonant frequency engine speed.

9. The machine of claim 8, further comprising an engine starter operatively connected to the engine, the engine starter adapted to apply power to the engine, and wherein:
the electronic control module is operatively associated with the engine starter; and
the electronic control module is further configured to control the engine starter to apply power to the engine when the clutch engages and at least until the engine speed exceeds the resonant frequency engine speed.

10. The method of claim 6, wherein the at least one powertrain component is a transmission.

11. A method of starting an machine, the method comprising the steps of:
providing an engine operable at various engine speeds including a resonant frequency engine speed;
providing a hybrid motor operable at various hybrid motor speeds including a predetermined hybrid motor speed that is sufficient to power the engine to an engine speed that exceeds the resonant frequency engine speed;

operatively connecting the hybrid motor to the engine through a clutch, the hybrid motor being adapted to apply power to the engine when the clutch is engaged and not adapted to apply power to the engine when the clutch is disengaged;

disengaging the clutch when the hybrid motor speed is less than the predetermined hybrid motor speed; and engaging the clutch after the hybrid motor exceeds the predetermined hybrid motor speed.

12. The method of claim 11 wherein the predetermined hybrid motor speed is associated with a predetermined hybrid motor kinetic energy; and the predetermined hybrid motor kinetic energy is sufficient to power the engine to a speed that exceeds the resonant frequency engine speed.

13. The method of claim 11, further comprising the steps of:

providing an electronic control module operatively associated with the clutch such that the electronic control module is adapted to control the clutch to engage and disengage; and controlling the clutch to disengage when the hybrid motor speed is less than the predetermined hybrid motor speed, and to engage when the hybrid motor reaches the predetermined hybrid motor speed.

14. The method of claim 11, further comprising the steps of:

operatively connecting an engine starter to the engine, the engine starter adapted to apply power to the engine; and applying power to the engine with the engine starter when the clutch engages until at least a time when the engine speed exceeds the resonant frequency engine speed.

15. The method of claim 11, further comprising the steps of:

operatively connecting the hybrid motor to at least one powertrain component, the at least one powertrain component being operatively connected to the hybrid motor such that the hybrid motor is adapted to apply power to the at least one powertrain component;

operatively connecting the at least one powertrain component to the engine through the clutch; and transferring a powertrain component kinetic energy to the engine when the clutch is engaged.

16. The method of claim 15, further comprising the steps of:

operatively connecting an engine starter to the engine, the engine starter adapted to apply power to the engine; and applying power to the engine with the engine starter when the clutch engages until at least a time after the engine speed exceeds the resonant frequency engine speed.

17. The method of claim 15 wherein the at least one powertrain component is a transmission.

18. A method of starting a machine, the method comprising the steps of:

providing a clutch adapted to engage and to disengage;

providing a hybrid motor operable at various hybrid motor speeds;

operatively associating an ignition switch with the hybrid motor;

operatively associating an electronic control module with the clutch and the hybrid motor, the electronic control module configured to control the clutch to engage and disengage;

operatively connecting an engine to the hybrid motor through the clutch, such that the hybrid motor is adapted to apply power to the engine when the clutch is engaged and the hybrid motor is not adapted to apply power to the engine when the clutch is disengaged;

starting the hybrid motor when the ignition switch is triggered;

controlling the clutch to disengage when the ignition switch is triggered; and controlling the clutch to engage after the hybrid motor exceeds a predetermined hybrid motor speed that is sufficient to power the engine to an engine speed that exceeds a resonant frequency engine speed.

* * * * *